United States Patent
Reid et al.

(10) Patent No.: US 11,936,627 B2
(45) Date of Patent: Mar. 19, 2024

(54) PRIVACY PRESERVING DATA SHARING FOR CAMPAIGNS

(71) Applicant: Apple Inc., Cupertino, CA (US)

(72) Inventors: Garrett T. Reid, Palo Alto, CA (US); John Wilander, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/219,042

(22) Filed: Mar. 31, 2021

(65) Prior Publication Data

US 2021/0400023 A1 Dec. 23, 2021

Related U.S. Application Data

(60) Provisional application No. 63/041,785, filed on Jun. 19, 2020.

(51) Int. Cl.
 *G06Q 30/00* (2023.01)
 *G06Q 30/0242* (2023.01)
 *H04L 9/40* (2022.01)
 *H04W 12/02* (2009.01)

(52) U.S. Cl.
 CPC ..... *H04L 63/0421* (2013.01); *G06Q 30/0246* (2013.01); *H04W 12/02* (2013.01)

(58) Field of Classification Search
 None
 See application file for complete search history.

(56) References Cited

U.S. PATENT DOCUMENTS

| | | | |
|---|---|---|---|
| 9,632,765 B1* | 4/2017 | Falcone | H04L 63/0823 |
| 2011/0307385 A1 | 12/2011 | St. Pierre et al. | |
| 2012/0166272 A1* | 6/2012 | Wiley | G06Q 30/0246 |
| | | | 705/14.45 |
| 2014/0095297 A1 | 4/2014 | O'Reilly | |
| 2015/0242885 A1* | 8/2015 | Alsina | G06Q 30/0244 |
| | | | 705/14.43 |
| 2019/0213332 A1* | 7/2019 | McCoy | G06F 21/6245 |
| 2020/0334708 A1* | 10/2020 | Knox | G06Q 20/123 |

OTHER PUBLICATIONS

Claffy; Dialing Privacy and Utility_ A Proposed Data-Sharing Framework; IEEE; pp. 31-39; 2010.*
Kazemi; Towards preserving privacy in participatory sensing; PerCom; pp. 328-331; 2011.*

* cited by examiner

*Primary Examiner* — Radu Andrei
(74) *Attorney, Agent, or Firm* — BAKERHOSTETLER

(57) ABSTRACT

A framework associated with an online store is configured to enable privacy preserving data sharing for invitational campaigns by limiting the amount of data that is shared to a content delivery network for the campaign until a sufficient number of interactions have occurred to provide crowd anonymity to participants in the campaign.

20 Claims, 13 Drawing Sheets

PRIVACY PRESERVING DATA SHARING FOR CAMPAIGNS

CROSS-REFERENCE

This application claims the benefit of priority of U.S. Provisional Application No. 63/041,785 filed Jun. 19, 2020 which is incorporated herein by reference.

FIELD

Embodiments described herein relate generally to a system to facilitate data sharing for invitational campaigns while preserving the privacy of associated users

BACKGROUND OF THE DESCRIPTION

Content providers and content delivery networks have developed techniques to analyze how a user interacts with the provided content. Often the content providers and content delivery networks work together to determine if the content was ignored or viewed, and if viewed did the user interact with the content. To gather this data content providers and content delivery networks developed techniques that modify content to include digital watermarks, or other computer code to report the data back to the content provider and content delivery network. However, such methods required a great degree of collaboration and coordination amongst content providers, content developers, content hosts, content delivery networks, etc. Furthermore, such content may be incomplete or inaccurate due to the large number of assumptions involved.

SUMMARY OF THE DESCRIPTION

Embodiments described herein provide techniques to enable privacy preserving data sharing for campaigns. A framework associated with an online store can facilitate privacy preserving data sharing for invitational campaigns by limiting the amount of data that is shared to a content delivery network for the campaign until a sufficient number of interactions have occurred to provide crowd anonymity to participants in the campaign.

One embodiment provides a method performed on an electronic device including one or more processors, where the method includes executing a first application via the one or more processors and receiving a request to download a second application at an interface associated with an application store. The request is received via an application store interface after receipt of an input to select an advertisement displayed by the first application. The advertisement displayed by the first application is associated with an advertisement campaign of an advertisement network. The request to download the second application can represent a conversion to be added to conversion metrics for the advertisement campaign. The method additionally includes creating a postback data structure in memory of the electronic device, the postback data structure including a notification of a conversion for an advertisement campaign to which the advertisement is associated and retrieving, from one or more servers associated with the application store, anonymity metrics associated with the advertisement campaign. The method additionally includes determining, based on the anonymity metrics, a set of data to include in the postback data structure and transmitting the postback data structure to a server associated with the advertisement network, the postback data structure including the set of data determined based on the anonymity metrics. Systems, method, and electronic devices that implement the above operations are also provided by embodiments described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein provide techniques to enable privacy preserving data sharing for campaigns. Relevant campaigns include purchase invitation (e.g., advertisement) campaigns facilitated via a content delivery network, such as an advertising network.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021 Apple Inc.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
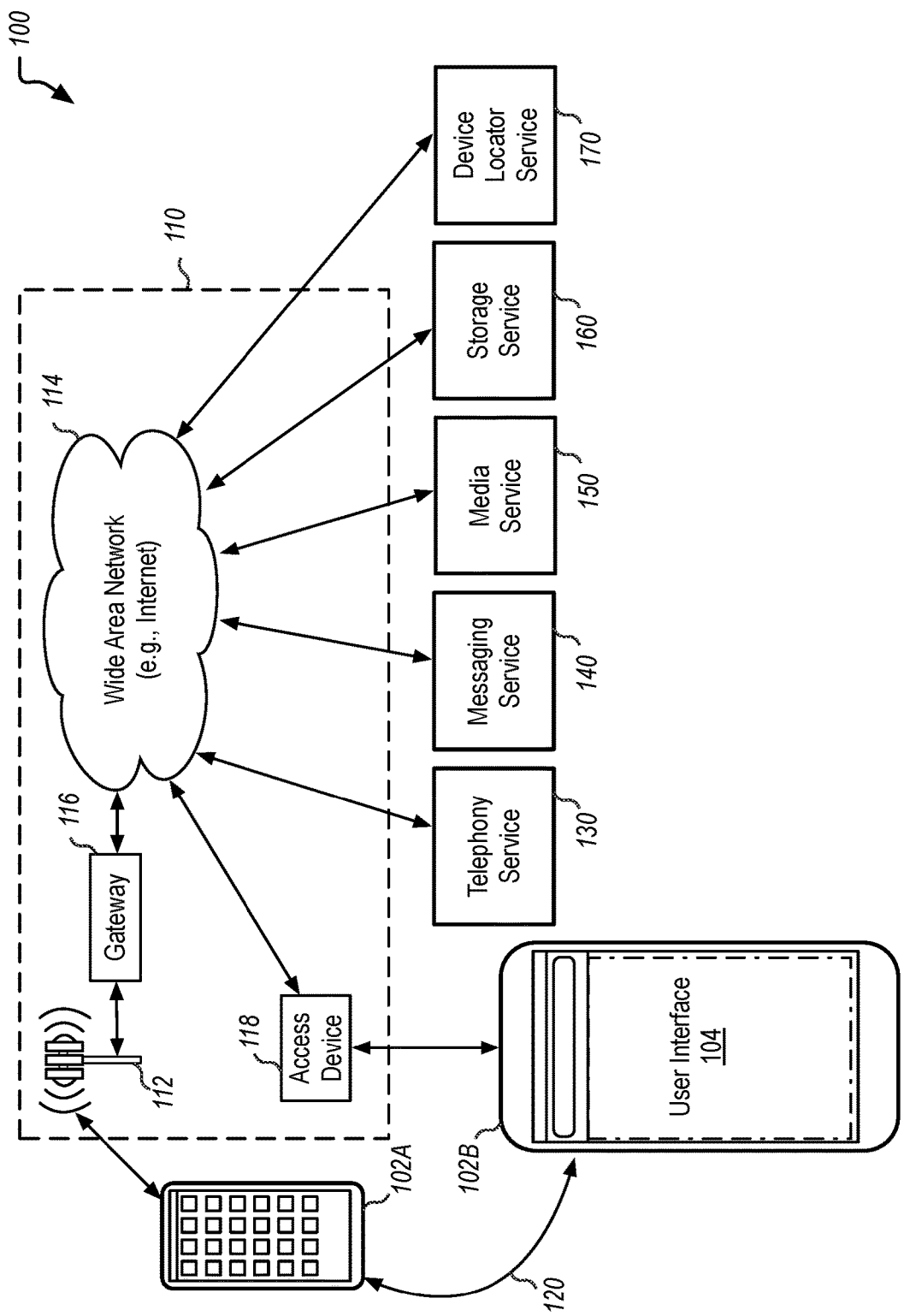
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and a wireless accessory device. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

In one embodiment the media service 150 of FIG. 1 is associated with an online store that can facilitate the purchasing and/or downloading of media and applications. This online store can be generally rereferred to as an App Store, although the online store system can facilitate the purchase of books, music, television programs, movies, and other media in addition to applications. Applications can interact with the App Store via a StoreKit framework. The StoreKit framework is a collection of one or more libraries that can be linked with applications to enable the applications (e.g., apps) to perform purchases and interactions with the App Store that is accessible via an electronic device. Apps may be ad-supported applications that display advertisements to users of the application within the user interface of the application while the app is in use. The advertisements can include advertisements provided via one or more advertisement networks. App developers can purchase ads via an advertisement network that display and advertisement for apps by that app developer. Ads for those applications can then be displayed by other apps that make use of the advertisement network. When a user clicks on an advertisement, a page in the App Store can be presented to enable the user to purchase the advertised app.

The StoreKit framework can provide an API that enables validated attribution of advertiser-driver App installations. Install validation informs an ad network when users install and launch a product purchased after viewing an ad. Ad networks initiate validation by providing signed information, including a campaign ID, when displaying the ad. Later, if the ad results in a conversion, the App Store client notifies the ad network with a postback that includes the same campaign ID. The advertisement network can then provide developers with metrics on advertisement conversions to enable the developers to track the success of the advertisement campaign.

Figure 2:
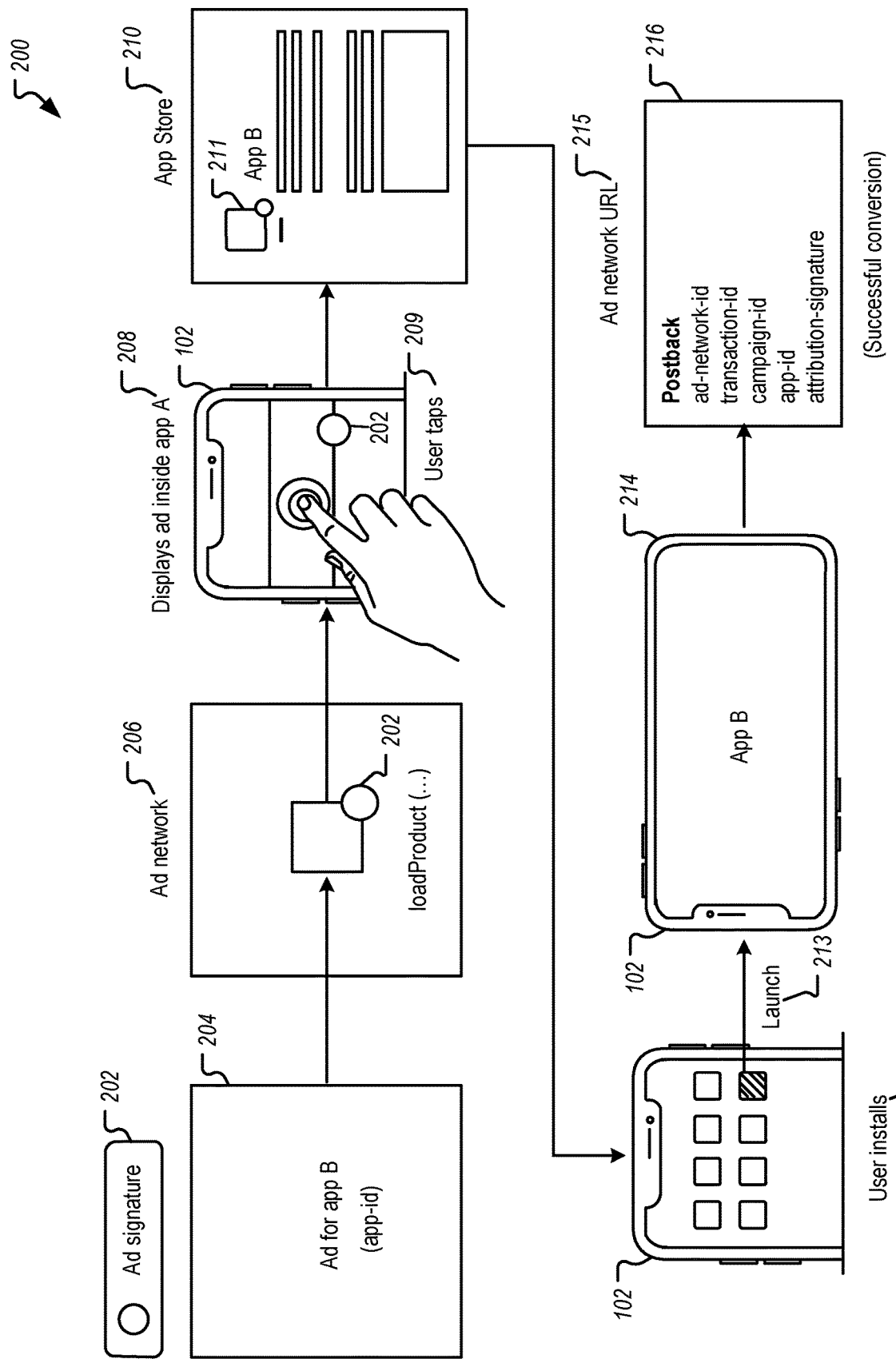
FIG. 2-3 illustrate systems to attribute successful invitation conversions to the associated campaign.

FIG. 2 illustrates a system 200 to report a successful conversion to an advertiser network. In one embodiment an ad network API helps developers measure the success of an ad campaign while maintaining user privacy. Apps can participate by displaying ads that ad networks serve, or by being advertised. When a user taps an ad, an App Store product screen is displayed that provides a user with the ability to purchase and install the advertised app. If a user installs and opens an app, the App Store client can send a conversion notification for that campaign to the ad network that identifies, at the least, the ad network, ad campaign, and installed app associated with the conversion. In one embodiment, the device can store the last signed parameters for the advertised application for 30 days. The stored parameters can be replaced by the most recent version provided. Any conversion by the user in that time is credited. The conversion notification is signed by the provider of the App Store and does not include user-specific or device-specific data.

During operation, an ad signature 202 is applied to an ad 204 to enable the identification of the campaign with which the ad 204 is associated. The ad 204 can be for an application (App B) that can be purchased and/or downloaded from the App Store. The ad 204 can have an app-id that identifies the app that is being advertised. A content delivery network, such as an advertisement network (e.g., ad network 206), can facilitate the delivery of an advertisement campaign on behalf of the app developers, such as the developer for App B. Connections to the ad network 206 can be established directly or via a proxy server. The ad network 206 can deliver the ad 204 with the ad signature 202. A mobile device 102 can execute an application (App A) that is registered with the ad network 206 to display advertisements inside the application (208). An advertisement for App B can be displayed via the interface of App A. When a user taps (209) the ad for App B that is displayed in App A, the app-id included in the ad 204 enables a UI for the App Store 210 to be loaded. The UI for the App Store 210 can include a UI element 211 that enables the purchase and/or download of App B.

A user can install (212) App B on the mobile device 102. Upon request from the user, the mobile device 102 can perform a launch operation (213) for App B. After the launch operation (213), a UI 214 for App B can be displayed. Upon first launch of App B, or after expiration of a timer, as described with respect to FIG. 7, the App Store 210 on the mobile device 102 can send a postback 216 to the ad network 206 using an ad network URL 215. The ad network URL 215 may be provided via the ad signature 202 and can be captured when the user taps (209) the ad. The App Store 210 sends the postback 216 out of process both App A and App B. Accordingly, program code that executes in either App A or App B will be unaware of when the postback 216 is transmitted to the ad network 206.

The postback 216 includes, but is not limited to an ad-network-id that identifies the ad network 206, a transaction-id for the postback, a campaign-id that identifies the ad campaign, the app-id that identifies the app that was advertised and purchased (App B), and an attribution signature that attests to the validity of the conversion attribution. The attribution signature is provided to enhance developer trust that the conversion metrics are legitimate, such that the conversion is associated with an actual application install that is correlated to an actual advertisement that was selected by a user. However, the postback 216 does not include user level data that identifies a user associated with the conversion.

The software architecture of the advertisement system provided by the App Store 210 indicates that program code associated with the ad network 206 may execute in both the application that presented the advertisement and the application that was purchased as a result of the advertisement. As it may be beneficial to the app developer and/or the ad network 206 to gather as much information as possible about the advertisement conversion, the program code of the advertisement network that executes in those applications may gather data about the advertisement conversion that can be transmitted to servers associated with the ad network 206. Correlation logic on those servers may analyze the data to extract information about the conversion that may be useful for marketing purposes, potentially at the expense of the privacy of the user. For example, if sufficient information about the conversion is transmitted in the postback 216, the ad network may be able to correlate the postback data and information known by the advertisement network about both the application that presented the advertisement (App A) and the installed advertised application (App B) to link the transaction to a specific user. The link can be established by the ad network 206 by correlating a specific instance of App A with a specific instance of App B. It may then be possible for the ad network 206 to determine that the user associated with those specific instances are the same user. To mitigate this privacy risk, the information that is presented via the postback 216 is limited to prevent this correlation. In one embodiment, the information that is limited includes conversion data that may be transmitted by App B, and a source app identifier that identifies App A.

During the postback 216 provided for App B, conversion data may be provided to the ad network 206 for delivery to the developer of App B. The conversion data can include metrics about activity that user has per performed after the download and install of App B that may be relevant to the developers of App B or the advertisement network. The conversion value may be encoded in a N-bit number which may be used by the developer of App B or the ad network 206 to encode any information. In one embodiment, the conversion value is a 6-bit number that may be used to encode a value of between 0 and 63. The conversion value can represent, for example, post install activity performed by the user after installing App B, user retention data, and/or data that can be used to rate a return on investment on the advertisement campaign for App B. The conversion value can also reflect characteristics of an account associated with the App Store 210. The account associated with the App Store 210 may be associated with other applications provided by the developer of App B and the conversion value may reflect activity performed using those other applications. For example, if the developer of App B also provides App C, which may be a game that has been downloaded and played by a user of the App Store account, game activity data from App C may be provided as part of the conversion data of App B to indicate that the user has played other games, or used other applications provided by the developer of App B. In one embodiment, App B can update the conversion value multiple times before a final conversion value is transmitted as conversion data within the postback 216. Embodiments described herein provide techniques to limit when conversion data is transmitted within the postback 216 to limit the ability of the ad network 206 to use the conversion data to link the conversion to a specific user.

An application identifier that identifies the source of the selected advertisement (e.g., App A) may be transmitted within the postback 216. This source app ID can be used by the ad network 206 to generate metrics for the advertisement campaign for App B. However, when a low number of conversions have occurred for an advertisement campaign, the source app ID may be used to by the ad network 206 tie the postback 216 with specific instances of App A and App B. If specific instances of App A and App B may be determined, the ad network 206 may be able to determine the identity, or other information about a specific user. In one embodiment, transmission of the source app ID within the postback 216 is limited until a sufficient number of conversions have occurred.

In addition to the conversion data and source app ID, in various embodiments, the transmission of other information that is transmitted within the postback 216 may be limited if such information may be used by the ad network 206, alone or in combination with other data known by the ad network 206, to determine information that impacts the privacy of a user associated with a conversion.

Figure 3:
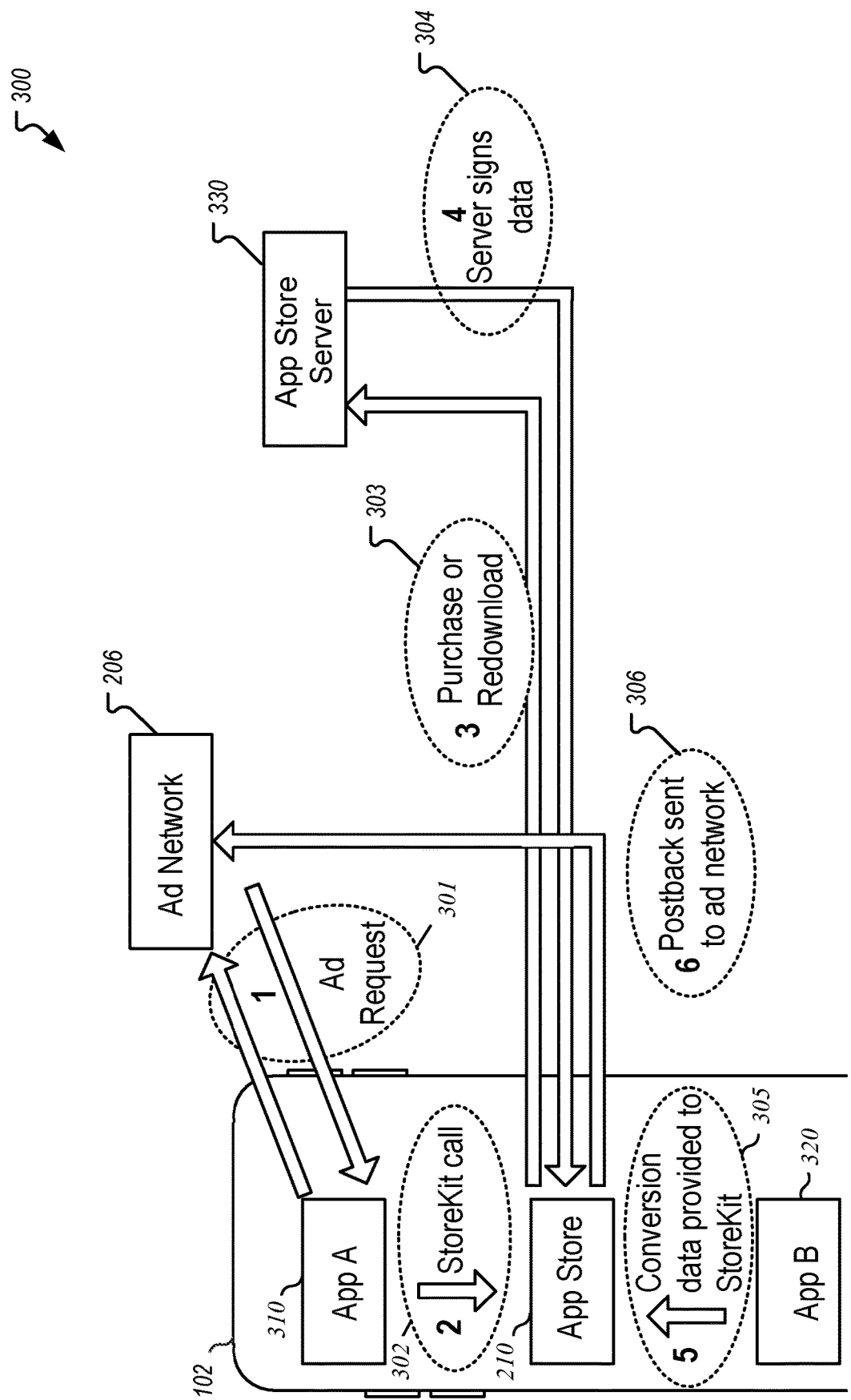

FIG. 3 illustrates a system 300 to generate an ad network postback that enables privacy preserving data sharing for campaigns. An application 310 (App A) that executes on the mobile device that is registered with the ad network 206 can send (301) an ad request to the ad network 206. App A may be linked with an advertisement SDK that enables the application to receive the advertisement via an advertisement network. App A and the ad network 206 may be different parties. In response to the request, an advertisement can be provided to App A. The advertisement can be associated with a specific campaign that is associated with a developer for a different application 320 (App B). As also illustrated in FIG. 2, App A can display the advertisement and a user can tap, click, select, or otherwise interact with the advertisement. This interaction can cause a call (302) into functionality provided by the StoreKit framework. The call into the StoreKit framework can cause the mobile device 102 to display an interface that allows the user to purchase or redownload (303) App B from the App Store server 330. A redownload can be performed if the user has previously purchased App B and App B is not currently on the mobile device 102. If the user determines to purchase or redownload App B, the user can select an interface element presented in the interface, which causes a request to acquire App B to be transmitted to the App Store server 330.

The request can also include data that attributes the purchase or redownload of App B to the advertisement presented by App A. The App Store server 330 can then compile data that evidences the purchase or redownload of App B in response to an interaction with an advertisement of a specific campaign, which can include at least a portion of the attribution data that is transmitted to the App Store server 330 along with the request to acquire App B. The App Store server 330 can sign data (304) that evidences the purchase or redownload of App B in response to an interaction with an advertisement of a specific campaign. This signed data can be provided to the ad network 206 in the postback. To determine which information is provided and signed, the App Store server 330 can perform a crowd anonymity calculation.

The crowd anonymity calculation is performed to limit the information that is provided to the ad network based on the number of advertisement conversions and associated amount of postback data that has been previously provided to the ad network 206. As more non-unique transactions are performed, additional information may be provided without enabling the linking of the identities of the users associated with the conversions. In one embodiment, the App Store server maintains count for each tuple of <ad campaign, app>, such that each time an app is purchased as a result of an ad campaign, a counter is incremented. This counter can be used to determine the amount of crowd anonymity is present, for example, from the perspective of App B. Additional tuples can also be counted, as described below. As the count for the tuples increase, additional campaign data may be provided. Additional information on crowd anonymity is illustrated in FIG. 4-7.

After first launch, App B can provide (305) conversion data to the App Store 210. The conversion data is a bitfield that is specified by the developer of App B. The developer of App B can encode information that is of relevance to the developer about the new user that has been acquired for App B. This value may be continually updated as the user performs actions, such as advancing in a game application, performing in-app purchases, sharing applications, providing app reviews or comments, or other similar interactions. However, the conversion data is intended to enable the developer to provide some non-identifying information about the user. The specific information that is provided in the conversion data can be different for different developers and different applications. The App store 210 can then send (306) the postback to the ad network. The postback can include the signed attribution information for the campaign, as well as the conversion data provided by App B.

The data sharing for campaigns that is described herein is performed in a privacy preserving manner by limiting the ability for the ad network to determine specific non-anonymized information about the user. For example, privacy preserving techniques are applied to prevent data that is provided via the postback to the advertisement network to enable the advertisement network to tie the advertisement and transaction to specific instances of App A and App B. If specific instances of App A and App B can be identified by the advertisement network, the network will be able to link the user to the conversion.

Figure 4:
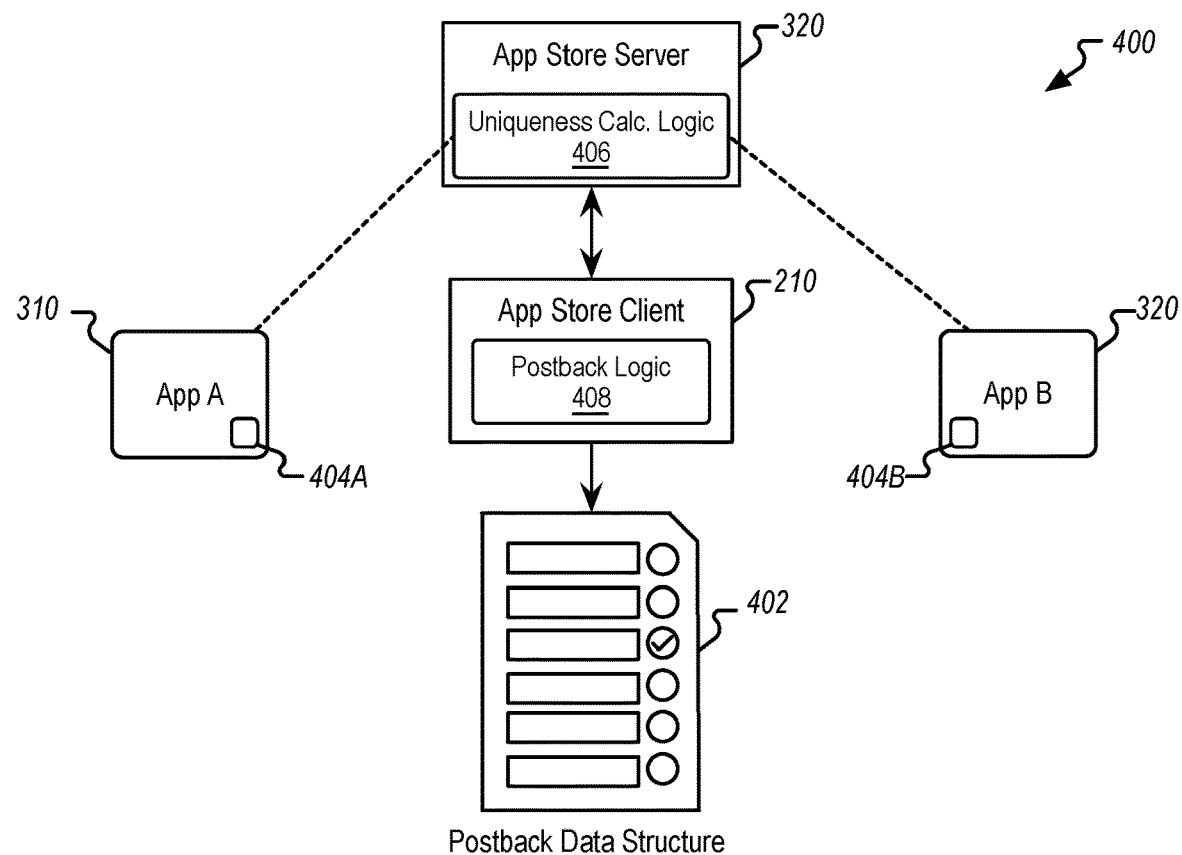
FIG. 4-7 illustrate systems to preserve user privacy when sharing verifiable data with content delivery networks.

FIG. 4 illustrates a system 400 to determine whether a postback data structure 402 sent by the App Store 210 may be linked to specific instances of the application 310 (App A) that presents an advertisement and the application 320 (App B) that is advertised. The postback data structure 402 is an instance of the postback 216 described herein and is provided by postback logic 408 included within client logic of an App Store 210 on an electronic device. The postback data structure 402 can include an ad network ID, transaction ID, campaign ID, app ID and attribution signature. The postback logic 408 can additionally include conversion data (e.g., conversion value) and a source app ID in the postback data structure 402 if the uniqueness calculation logic 406 on the App Store server 330 determines that including the conversion data and/or source app ID will not potentially leak the identity of the user associated with the conversion.

If the postback data structure 402 provides information for a reported conversion that can be determined to be unique to a user, user device, or a specific instance of App A and App B, that information may be correlated with a specific app instance that is known to an advertisement network (e.g., ad network 206). Having knowledge of the specific app instance may enable the ad network 206 to determine the specific user device associated with that app instance. Knowledge of the specific user device may be used to determine the identity of the user. In one embodiment, App A and App B may respectively execute program code 404A-404B associated with the advertisement network. Execution of the program code 404A-404B may allow the advertisement network to gain information that, along with information about advertisements delivered via the advertisement network and the data provided in the postback data structure 402, correlate an advertisement conversion with a specific user. The uniqueness calculation performed by the uniqueness calculation logic 406 is performed to mitigate against the risk of correlation. The uniqueness calculation can be performed based on a determination of which information is accessible to the advertisement network from the perspective of each of App A and App B.

From the perspective of App B, the uniqueness calculation perform by the uniqueness calculation logic 406 includes the number of people who have purchased and installed or re-downloaded App B, as well as the conversion value specified by App B when reporting a successful conversion, as the ad network will have access to both of those data elements. In one embodiment, the conversion value is specified by App B after the cloud anonymity calculation is performed. In such embodiment, the data used to model uniqueness from the App B perspective may be incomplete at the time of the calculation. In such embodiment, a multiplier for the count of non-unique conversions can be used to compensate for the incomplete information that is available at the time of calculation.

From the perspective of App A, data used for the uniqueness calculation includes the app that is showing the advertisement (App A), the app that is advertised (App B), and the ad campaign to which the advertisement belongs. Additionally, the ad network may have information on which user tapped the ad. The App Store server can count the number of unique combinations of the above information. A multiplier can also be applied to the calculations from the App A perspective to account for geographic correlation, as the ad network can assume that postbacks for an App Store that is specific to a geographic region will be associated with Internet Protocol (IP) addresses that originate from that geographic region. A geographic multiplier can also be used for App B. The multipliers for both the App A and App B perspectives can be tuned to balance between privacy and functionality.

Figure 5:
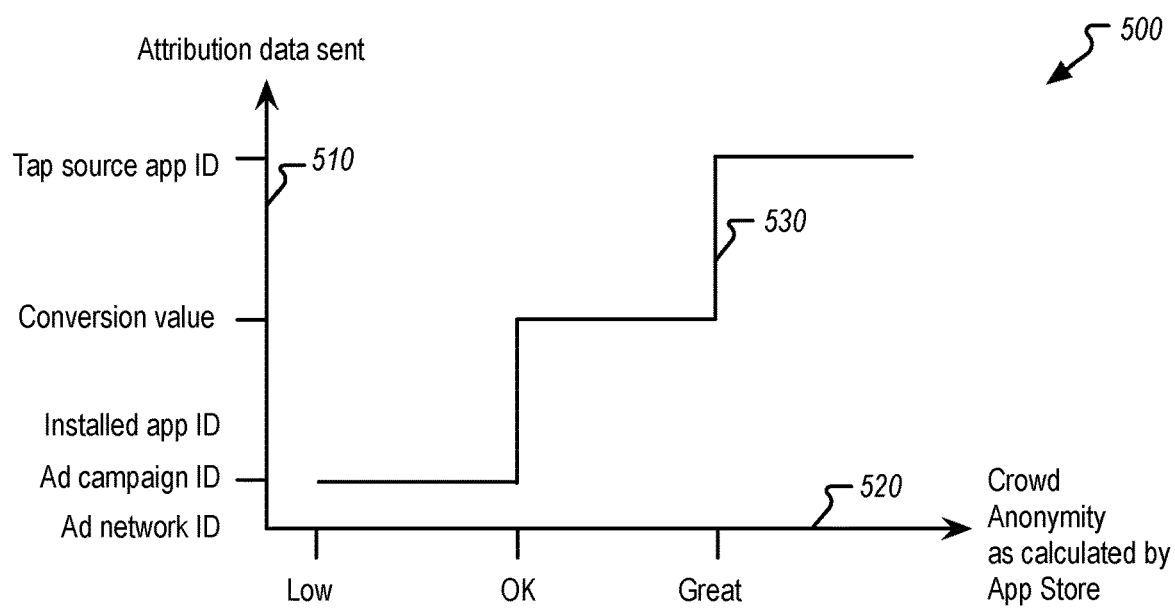

FIG. 5 is a graph 500 that illustrates the inclusion of additional data elements in postback data based on a calculated crowd anonymity. Axis 510 illustrates the amount of attribution data that may be sent in a conversion postback. Axis 520 illustrates a crowd anonymity value associated with an advertisement campaign, or another campaign of invitational content that is provided via a content delivery network. The crowd anonymity calculation determines the number of non-unique interactions performed in association with an advertisement campaign. A high crowd anonymity for an advertisement campaign correlates with a low likelihood that a postback for a reported conversion can be used to link a specific user to both legs (e.g., App A and App B) of a conversion. For each of these legs, an independent calculation is performed to determine the if the data is unique and can be used by the ad network to link the user. As data becomes non-unique, more data elements may be included within a postback. As the crowd anonymity value increases, the amount of attribution data (530) that is sent increases. Exemplary data used for the crowd anonymity calculation is shown in Table 1 below.

TABLE 1

| Data for Crowd Anonymity Calculation | |
| --- | --- |
| App A Leg | App B Leg |
| Tap source app (App A) | App B identifier |
| Installed app (App B) | Conversion value |
| Ad campaign identifier | |
| Ad network user identifier | |

In one embodiment, when all information is provided to the advertisement network, program code for the ad network that executes on App A leg is potentially aware of the App A identifier via a tap source app ID, the App B identifier via the installed app ID, the advertisement or invitational campaign to which the selected advertisement or invitation belong via the advertisement campaign ID. The advertisement network is also aware of any user identifiers that may have been assigned to the user by the advertisement network. Ad network code that executes on App B is aware of an identifier for App B by nature of advertisement network program code being executed by App B and a conversion value that is provided by App B after the first launch of App B. It will be noted that the ad network will also be aware of their own ad network ID. Uniqueness calculation logic 406 shown in FIG. 4 can use the information available for the App A and App B legs for an advertisement campaign to calculate the crowd anonymity for the campaign based on the number of non-unique combinations of the above data for in each leg. The crowd anonymity calculation can be provided to the postback logic 408 of FIG. 4, which can use those metrics to determine the set of attribution data to send in the postback for a conversion. Based on a determination of a number of conversions that have occurred with a non-unique combination of values on one or more legs of the calculation, the conversion value and tap source ID may be included within the postback data structure 402 of FIG. 4.

Figure 6:
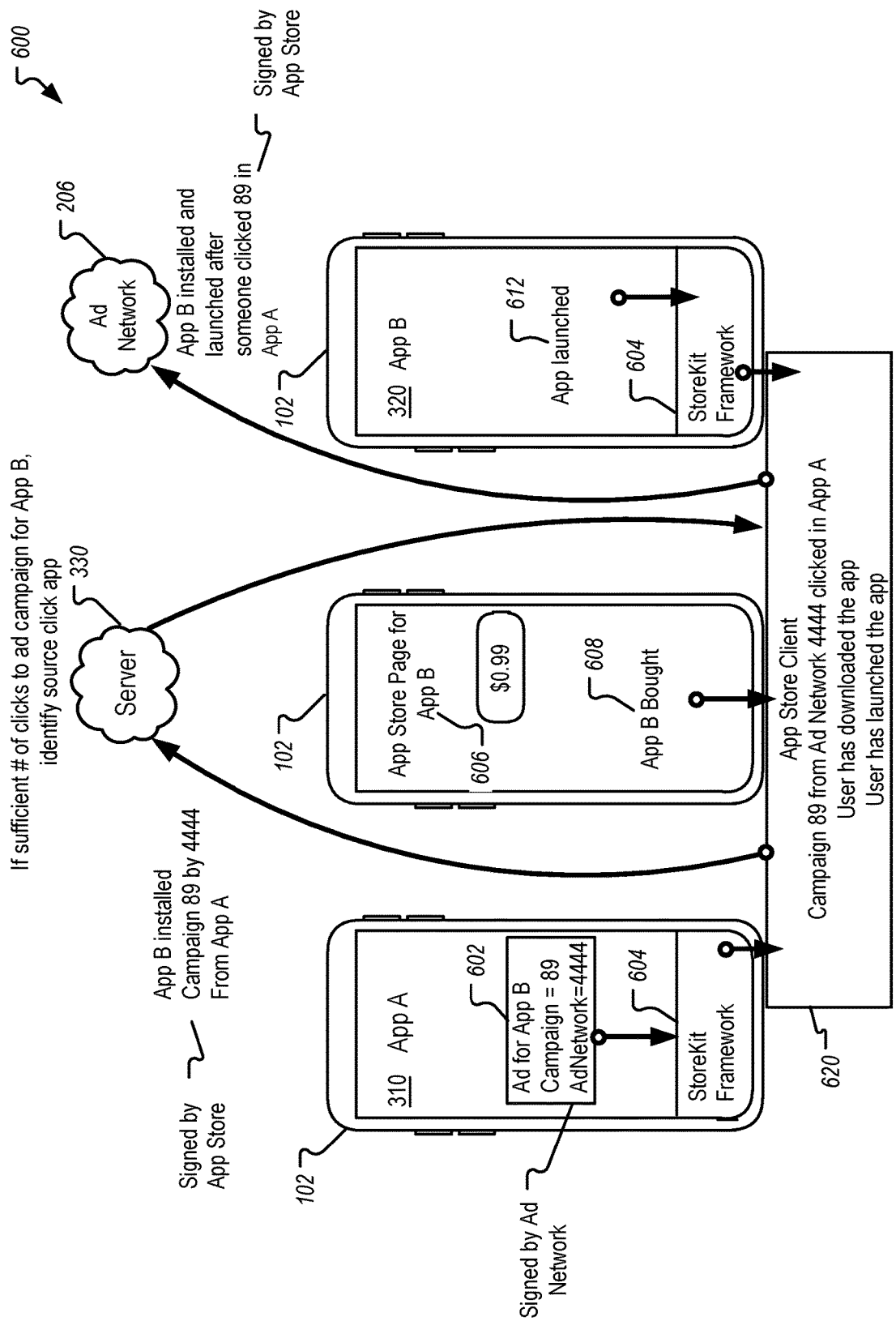

FIG. 6 illustrates operations 600 to enable privacy preserving data sharing for campaigns. On a mobile device 102, an application App A can display an ad 602 for App B that is part of a campaign having a campaign identifier of 89 that is run on an ad network having an identifier of 4444. This ad is signed by the ad network. When the ad is tapped by a user, the app can use the StoreKit framework 604 to communicate with an App Store client 620 on the mobile device 102. The App Store client 620 notes that campaign 89 from ad network 4444 was tapped in App A.

The App Store client 620 can present an App Store page 606 for App B that enables the user to download App B. When the user purchases (608), or re-downloads, app B, the App Store client 620 can note that the user has downloaded App B. The App Store client 620 can send a message to the App Store server 330 that is signed by the App Store client. This message is the signed ad information and is sent as part of the purchase. The crowd anonymity calculation is performed as part of the operational flow of the purchase. The App Store server 330 can perform a crowd anonymity calculation to determine, for example, if a sufficient number of clicks have been received for the ad campaign for App B to allow the identification of App A as the source click app. The App Store server 330 can sign attribution data that is returned to the App Store client 620.

When App B 320 is launched (612) on the mobile device 102, App B can use the StoreKit framework 604 to communicate to the App Store client 620 that the user has launched App B. App B may provide conversion data to the App Store client 620 at this time. The App Store client 620 can then send a postback message to the ad network 206 that indicates that App B has been installed and launched after someone tapped on an ad for campaign 89. If a sufficient number of clicks have been received for the campaign, the postback can also indicate that App A presented the ad that was tapped. The data sent in the postback includes attribution data signed by the App Store server 330. The specific attribution data that is included is based on the crowd anonymity determination made by the App Store server 330. The crowd anonymity analysis also allows the determination of whether the conversion data provided by App B can be sent to the ad network 206.

Figure 7:
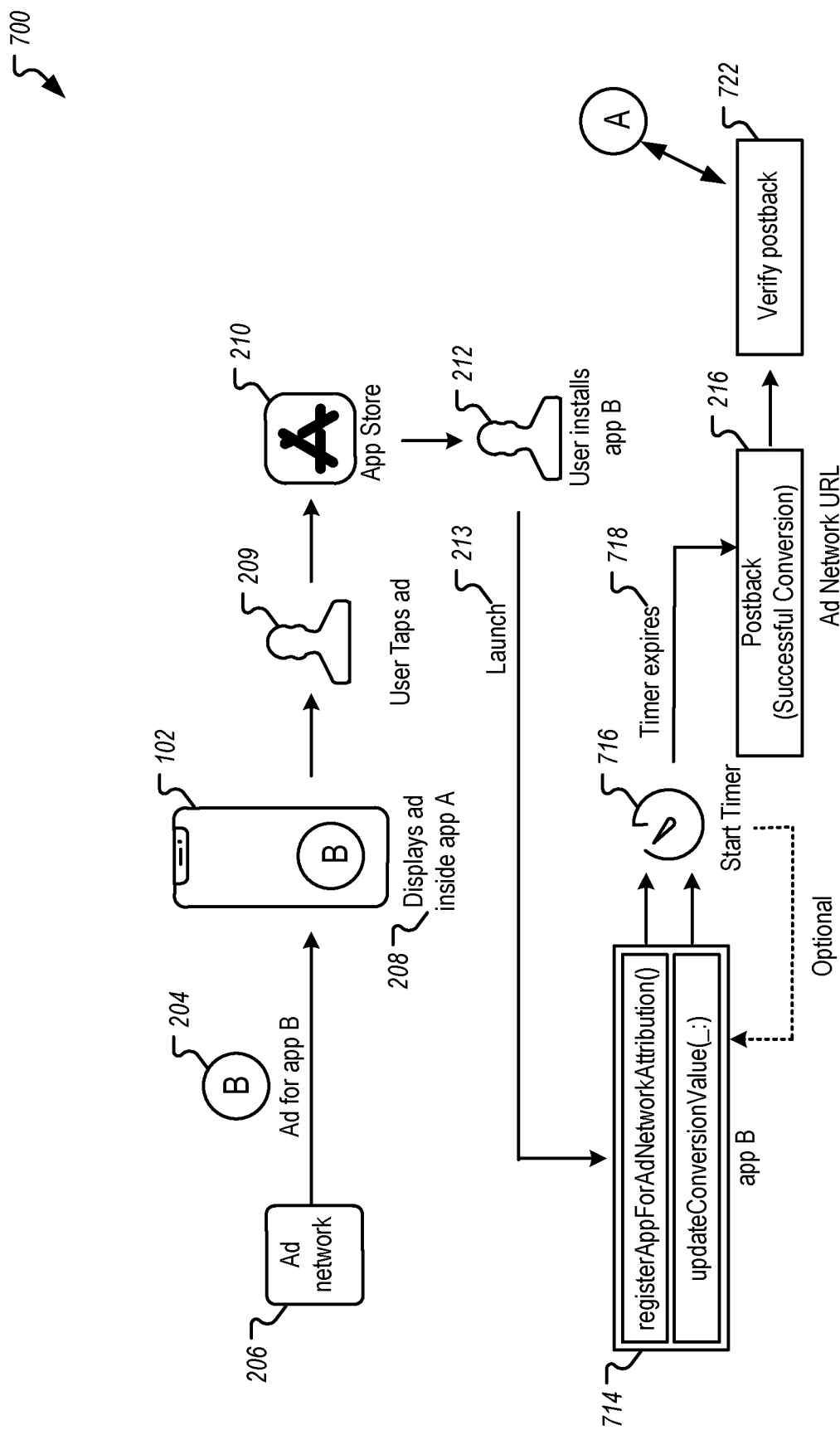

FIG. 7 illustrates additional operations 700 to enable verifiable and privacy preserving data sharing for campaigns. The illustrated operations 700 are similar to those discussed above, with the addition of addition features, such as a timer 716 to delay the postback 216 for a successful conversion. The postback 216 can be sent when the timer expires (718).

The timer 716 is added to delay the sending of the postback 216 so that the timing of the launch of App B on a user device and the sending of the postback to the ad network cannot be correlated by the ad network to identify the specific instance of App B. The timer 716 also allows the App B to collect the information that the application will use to update the conversion value. For example, if App B is a game application and the user launches and begins play, App B can update the conversion value during the timer period to reflect the progress the user makes during the game during the period after first launch. The timer 716 also gives time for a client IP address change to occur before the postback is sent, which prevents messages associated with the same IP address to be used for postback correlation.

When App B is launched (213), App B can call StoreKit framework functions 714 to register the application for ad network attribution and, at some point, to update a conversion value that will be sent to the ad network. The conversion value can be a new conversion value or can be an update of an existing conversion value that was determined based on logic specified by the app developer. Performing such operations will start the timer 716, which in one embodiment will count down from a timer value set to a value between a range of hours (e.g., between 24 and 48 hours). In one embodiment a fixed value can be used. In one embodiment a random value within the range may be used. In one embodiment, any subsequent update of the conversion value may extend the timer 716. The value of the timer may be transmitted to the advertisement network after the timer expires or after a maximum number of timer extensions has occurred. Additionally, the ad network can perform operations to verify the postback (722) for anti-fraud purposes. For example, the ad network can verify signatures applied by the App Store to ensure that the postback is a legitimate postback that has not been fabricated or altered.

An additional issue to be addressed is the issue of the ordering of conversion postbacks. For example, if there are two users with a given set of information the first will be unique (and send less info) and the second will be non-unique (and send more). However, the ad network 206 knows the order in which ads were viewed and the order in which viewed ads were tapped. Accordingly, the second user is non-unique but identifiable, as the second user is the first user for which additional information is sent. To mitigate this potential information leak, a randomized cutover is implemented in one embodiment, such that the first non-unique user has a low probability of full information, the next non-unique user has a higher probability, and so on. This probability may be modeled as 1-1/n, although other values may be used to fine-tune the system.

In one embodiment, re-downloads are handled as a separate type of conversion than an app purchase from the App Store. Each application has access to data that indicates whether the application was previously installed and can determine that a download is a re-download associated with a previous purchase. Redownload metrics can be provided to the ad network as a separate metric and can be counted separately for crowd anonymity. To provide support for separate counting of re-downloads, a server-side count of unique tuples over the last 24 hours is maintained and used as input to the uniqueness calculation. In one embodiment, counts can be performed for:

App B+Campaign ID.
App B+Campaign ID+App A.
App B+Campaign (re-downloads).

Figure 8A:
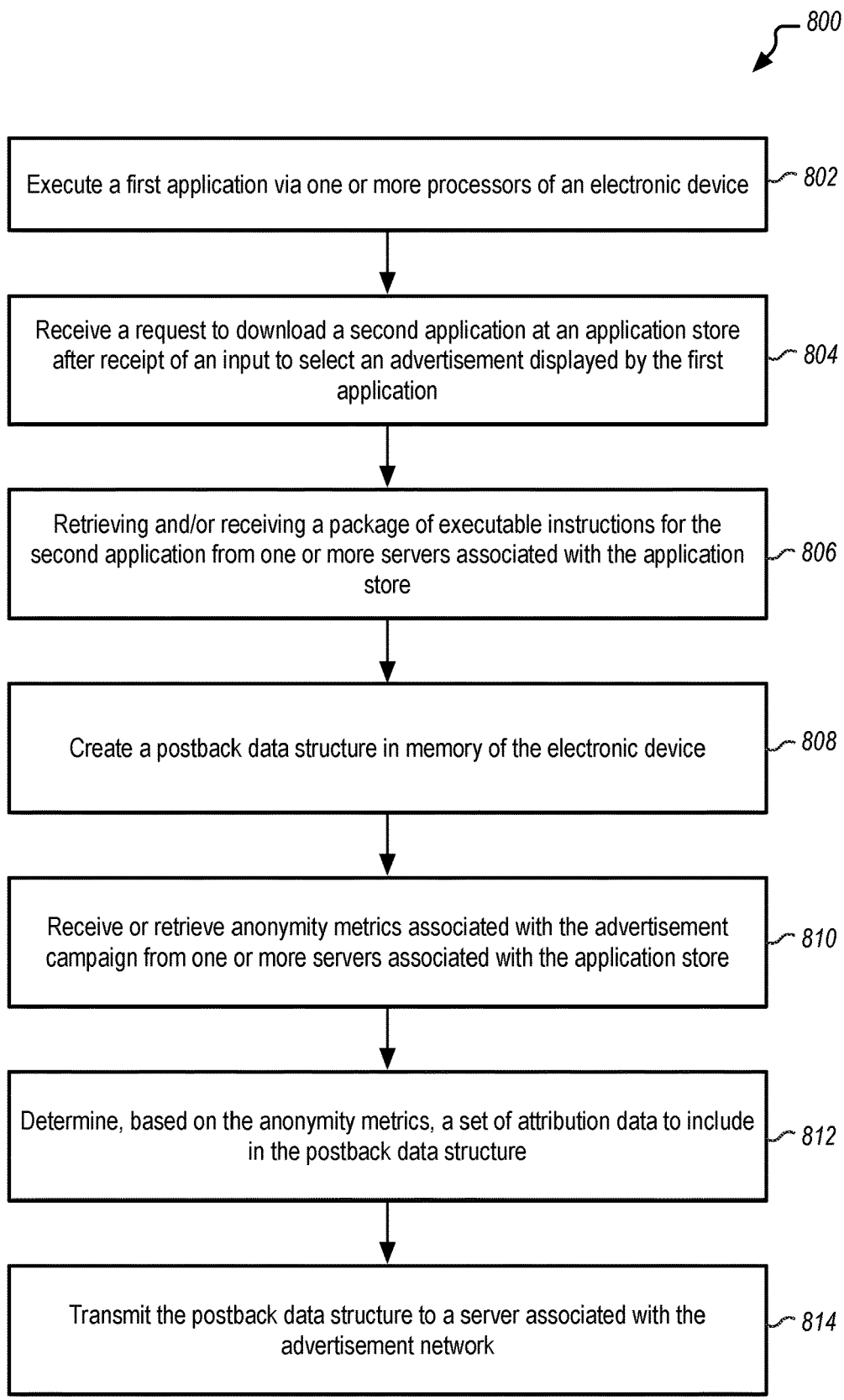
FIG. 8A-8B illustrate methods of limiting postback data to preserve user privacy.
Figure 8B:
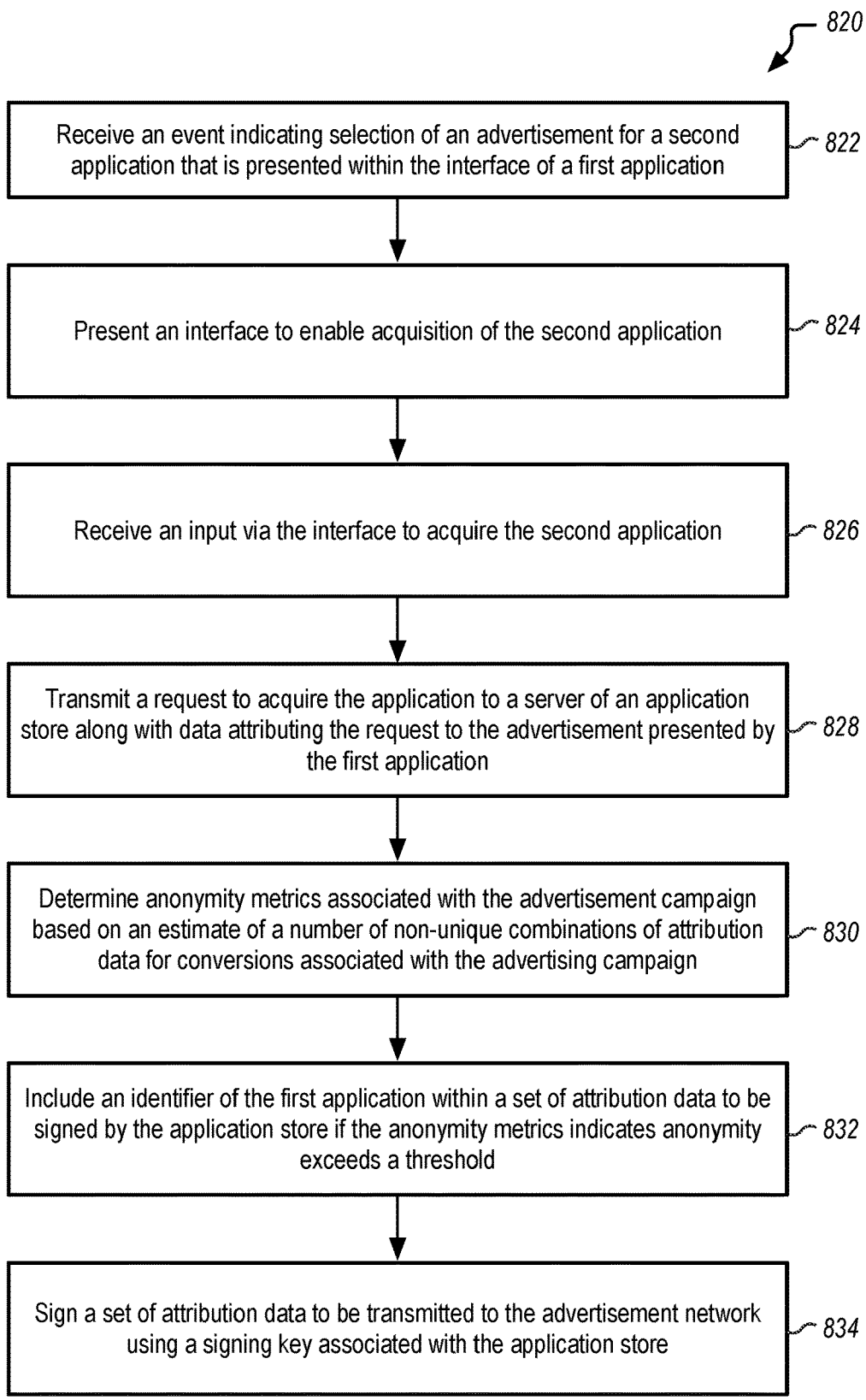

FIG. 8A-B illustrates methods of limiting postback data to preserve user privacy. FIG. 8A illustrates a method 800 to report attribution metrics for a conversion to be attributed to an invitational campaign. FIG. 8B illustrates a method 820 to determine an anonymity level for conversion data associated with an advertisement campaign.

With reference to FIG. 8A, an electronic device (e.g., mobile device 102) can perform operations to execute a first application (App A), such as application 310 of FIG. 3, via one or more processors of an electronic device (802). During execution of the first application, the electronic device can receive a request to download a second application (App B) at an application store after receipt of an input to select an advertisement displayed by the first application (804). The application store can be presented on the electronic device in response to receipt of the selection of the advertisement displayed by the first application. The application store can display an interface to enable the purchase, download, or re-download the second application. The electronic device can receive the request to download the second application via the interface presented by the application store. The request to download the second application represents a successful conversion for the advertisement campaign and a postback providing indication of the conversion can be transmitted to the advertisement network to enable the advertisement network to update the conversion metrics for the advertisement campaign. The conversion metrics for the advertisement campaign can be used to rate a return on investment of the campaign.

In one embodiment, the electronic device can download the application in response to the request. Downloading the application can include retrieving or receiving a package of executable instructions for the second application from one or more servers associated with the application store (806). Method 800 additionally includes a set of operations to enable the electronic device to create a postback data structure in a memory of the electronic device (808). The postback data structure includes or represents a notification and/or indication of a conversion for an advertisement or invitational campaign to which the advertisement is associated. The specific set of data that is included in the postback data structure is adjusted to limit the likelihood that the postback will result in the leaking of user information. The electronic device can retrieve anonymity metrics associated with the advertisement campaign from one or more servers associated with the application store (810). The anonymity metrics indicate a count and/or estimate of a number of conversions with non-unique combinations of data. The method 800 additionally includes operations to enable the electronic device to determine, based on the anonymity metrics, a set of attribution data to include in the postback data structure (812). As the number of non-unique combinations of data associated with a conversion increases, the degree of crowd anonymity associated with the conversion increases. The set of data can include, for example, a conversion value or other conversion data that may be generated by the second application and transmitted in the postback data structure. The set of data can also include a source app identifier that identifies the first application as the application that displayed the advertisement that was selected by the user. The method 800 additionally includes operations to enable the electronic device to transmit the postback data structure to a server associated with the advertisement network (814).

With reference to FIG. 8B, and in accordance with method 820, an application store on the electronic device can receive an event indicating selection of an interface element presented in an interface of a first application executed by one or more processors of an electronic device, where the interface element presents an invitation (e.g., advertisement) to acquire a second application (822). In response to the event, the app store can present an interface to enable acquisition of the second application (824). The specific interface to present is determined based on an identifier of the second application that is associated with the invitation that is presented by the first application. The interface can be an application store interface that includes a description of the second application and an interface element that enables a user to download the application, purchase and download the application, and/or re-download the application after a previous purchase. If the user elects to acquire the application the user can select the interface element, which will be received by the application store as an input to acquire the second application (826). The application store can then transmit a request to acquire the application to a server of the application store along with data attributing the request to the advertisement presented by the first application (828).

The application store, or a server associated with the application store, can determine anonymity metrics associated with the advertisement campaign based on an estimate of a number non-unique combinations of attribution data for conversions associated with the advertising campaign (830). The number of non-unique combinations of attribution data can be determined from the perspective of program code associated with the advertisement network that may be executed within the process space of the first application and/or the second application, as illustrated in FIG. 4. The application store can include an identifier of the first application within a set of attribution data to be signed by the application store if the anonymity metrics indicates anonymity exceeds a threshold (832). The identifier of the first application can be included along with other attribution data, which can include identifiers for the advertisement network, transaction, advertisement campaign, and the advertised application. In one embodiment a server of the application store can sign the attribution data using a signing key associated with the application store (834). The signed attribution data can then be returned to the electronic device for handling by a client process associated with the application store. The electronic device can transmit the signed attribution data to a server associated with the advertisement network that provided the application. In one embodiment, anonymity metrics determined for conversions associated with the advertisement campaign can also be transmitted to the electronic device along with the signed attribution data. The electronic device can use the anonymity metrics to determine whether to transmit conversion data provided by the second application to the server associated with the advertisement network.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 9:
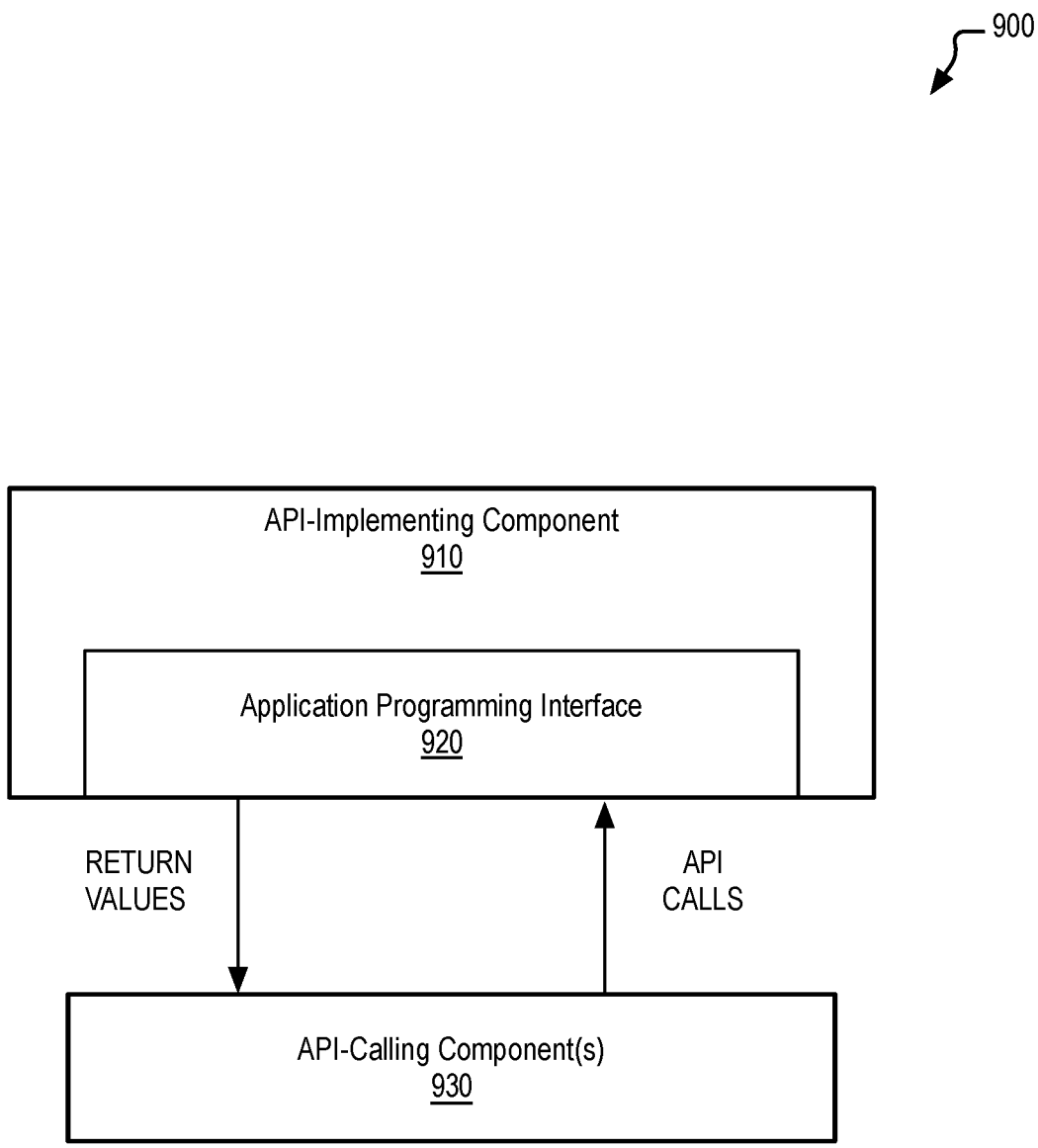
FIG. 9 is a block diagram illustrating an exemplary API architecture, which may be used in some embodiments of the invention.

FIG. 9 is a block diagram illustrating an exemplary API architecture, which may be used in some embodiments of the invention. As shown in FIG. 9, the API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable storage medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 10A:
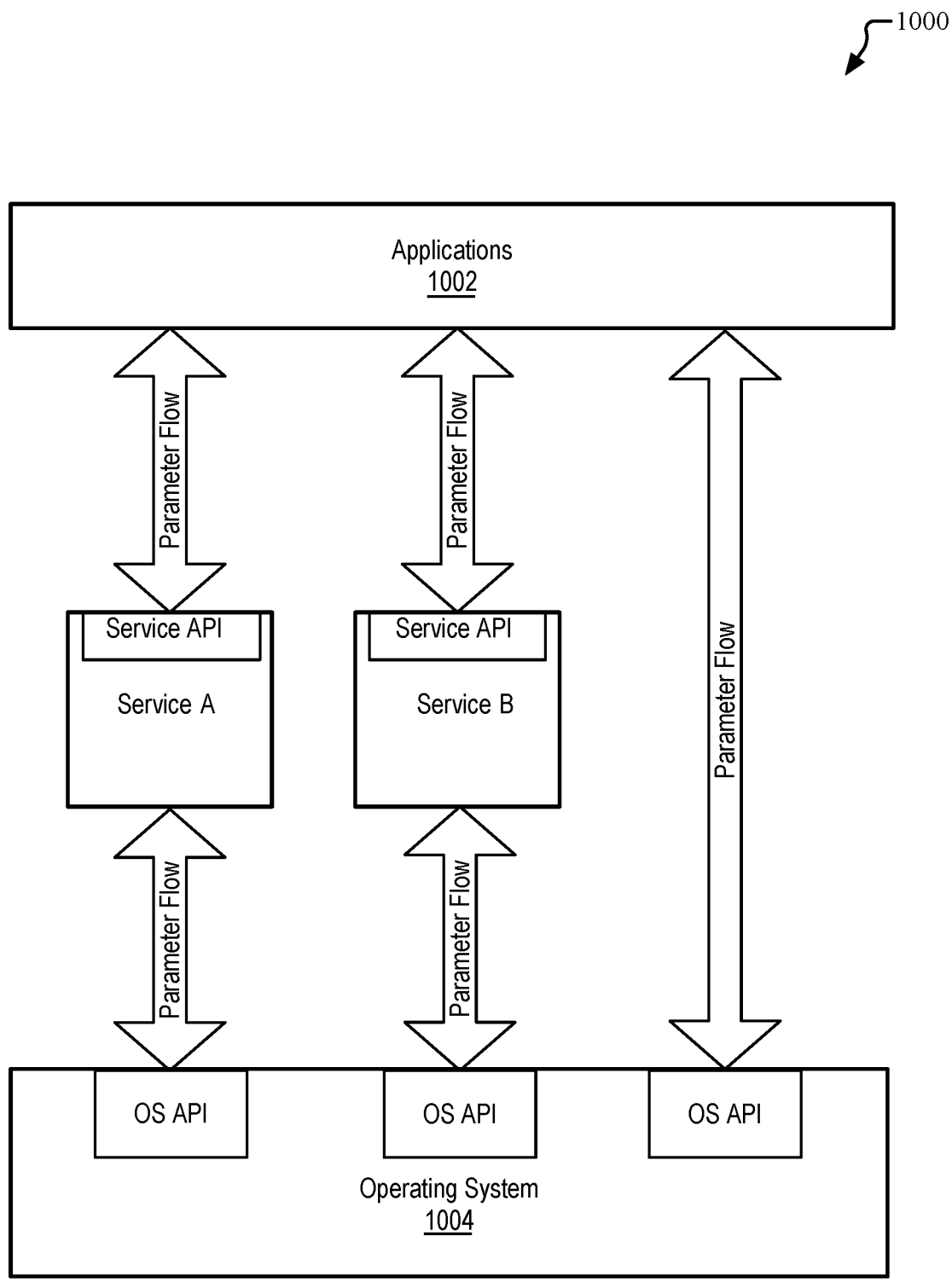
FIG. 10A-10B are block diagrams of exemplary API software stacks, according to embodiments.
Figure 10B:
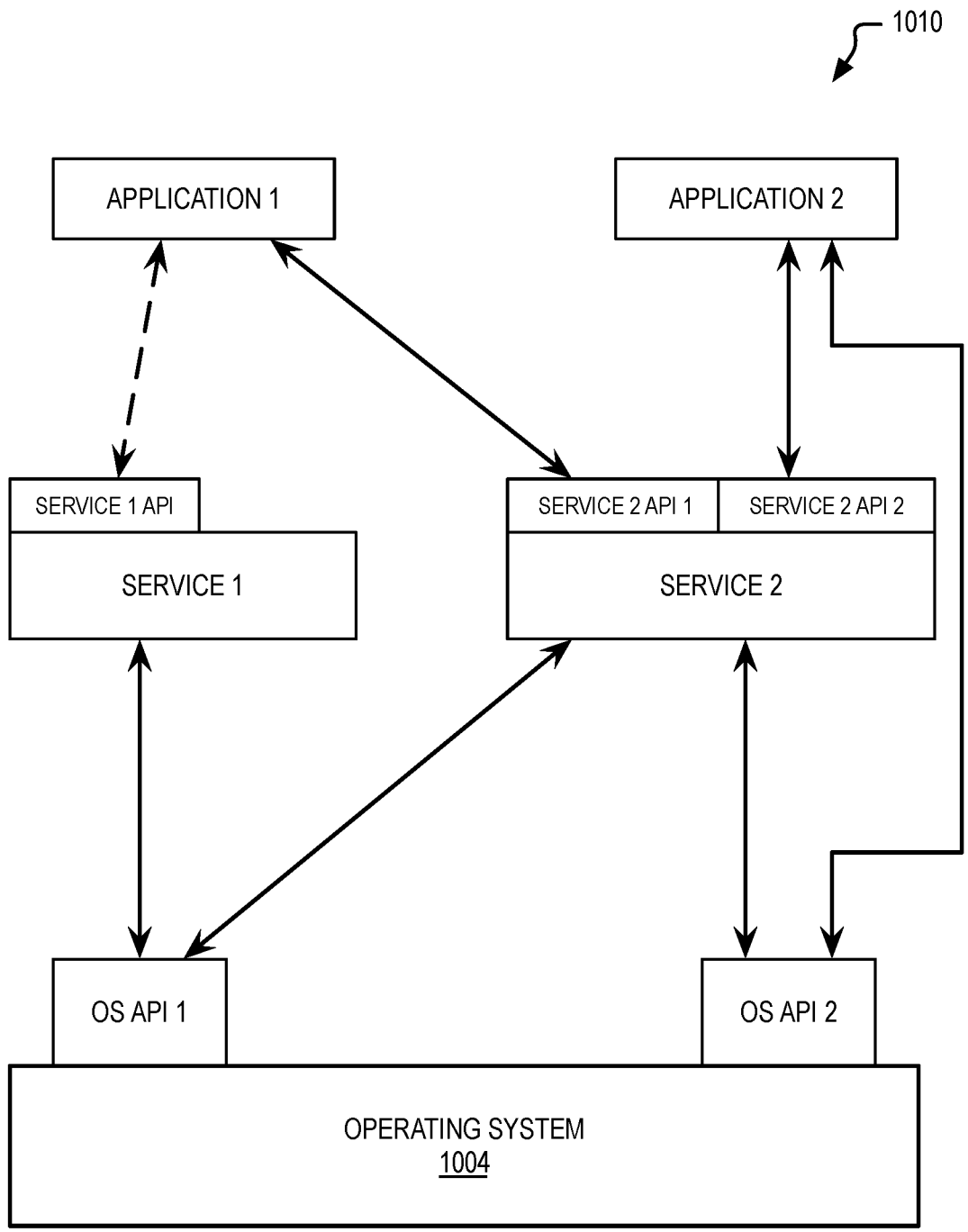

FIG. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary API software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 11:
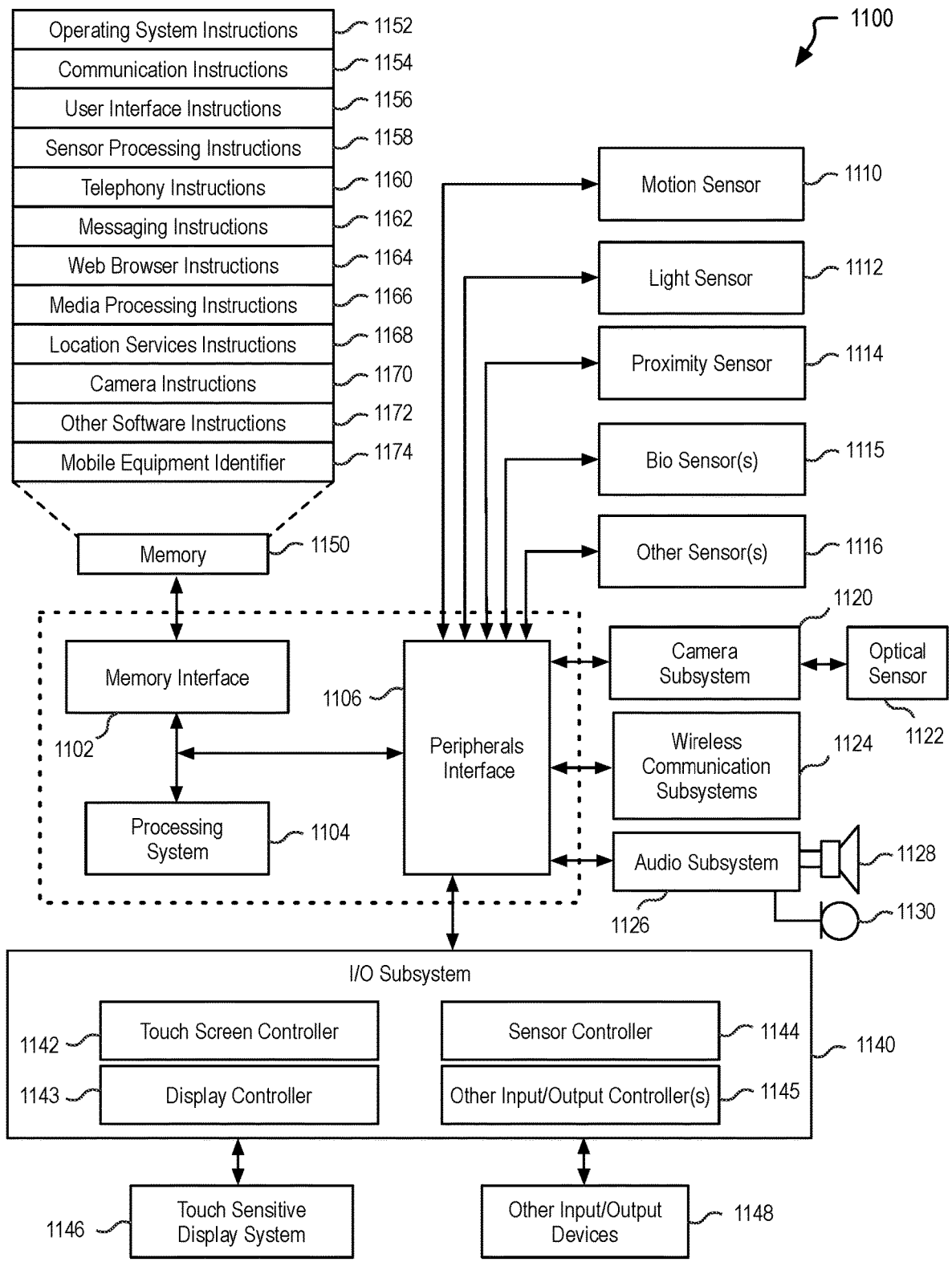
FIG. 11 is a block diagram of a device architecture for a mobile or embedded device, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor processor 1144 is included to monitor, control, and/or processes data received from one or more of the motion sensor 1110, light sensor 1112, proximity sensor 1114, or other sensors 1116. The sensor processor 1144 can include logic to interpret sensor data to determine the occurrence of one of more motion events or activities by analysis of the sensor data from the sensors. In one embodiment the sensor processor 1144 also manages the camera subsystem 1120 and audio subsystem 1126, with couple with the sensor processor 1144 via the peripherals interface 1106. Multimedia captured by the camera subsystem 1120 and/or audio subsystem 1126 may be relayed to the memory 1150 to be accessed by software executing on the processing system 1104, or processed by the sensor processor 1144 or other processors in the system to determine environmental metadata. In one embodiment, the sensor processor may configure a live audio stream to a hearing-aid device or wireless earbuds that are connected via a wireless processor, enabling the audio stream to bypass the processing system 1104 and memory 1150.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
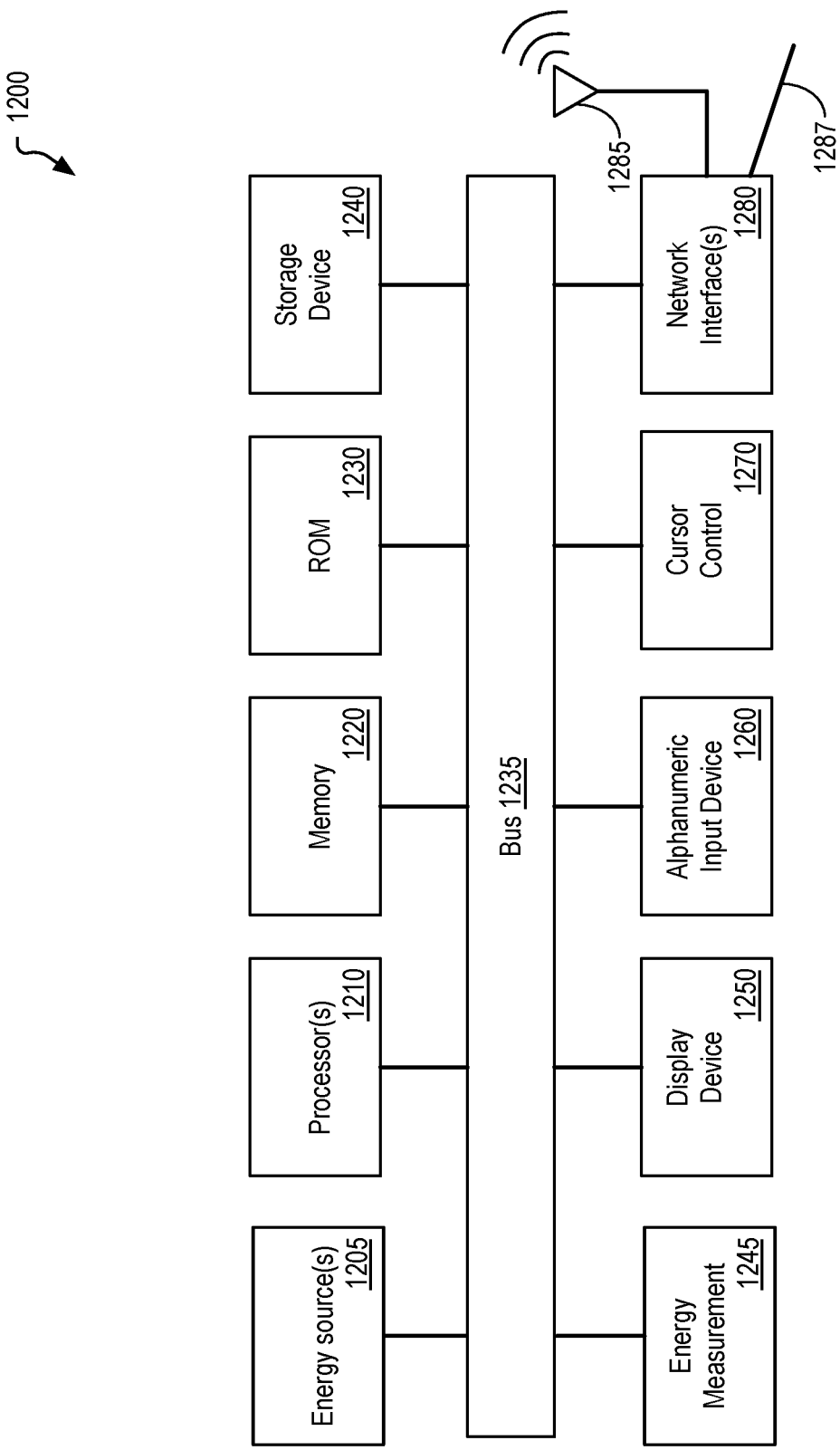
FIG. 12 is a block diagram of a computing system, according to an embodiment.

FIG. 12 is a block diagram of a computing system 1200, according to an embodiment. The illustrated computing system 1200 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1200 can be used to provide the computing device and/or a server device to which the computing device may connect.

The computing system 1200 includes bus 1235 or other communication device to communicate information, and processor(s) 1210 coupled to bus 1235 that may process information. While the computing system 1200 is illustrated with a single processor, the computing system 1200 may include multiple processors and/or co-processors. The computing system 1200 further may include memory 1220, which can be random access memory (RAM) or other dynamic storage device coupled to the bus 1235. The memory 1220 may store information and instructions that may be executed by processor(s) 1210. The memory 1220 may also be used to store temporary variables or other intermediate information during execution of instructions by the processor(s) 1210.

The computing system 1200 may also include read only memory (ROM) 1230 and/or another data storage device 1240 coupled to the bus 1235 that may store information and instructions for the processor(s) 1210. The data storage device 1240 can be or include a variety of storage devices, such as a flash memory device, a magnetic disk, or an optical disc and may be coupled to computing system 1200 via the bus 1235 or via a remote peripheral interface.

The computing system 1200 may also be coupled, via the bus 1235, to a display device 1250 to display information to a user. The computing system 1200 can also include an alphanumeric input device 1260, including alphanumeric and other keys, which may be coupled to bus 1235 to communicate information and command selections to processor(s) 1210. Another type of user input device includes a cursor control 1270 device, such as a touchpad, a mouse, a trackball, or cursor direction keys to communicate direction information and command selections to processor(s) 1210 and to control cursor movement on the display device 1250. The computing system 1200 may also receive user input from a remote device that is communicatively coupled via one or more network interface(s) 1280.

The computing system 1200 further may include one or more network interface(s) 1280 to provide access to a network, such as a local area network. The network interface(s) 1280 may include, for example, a wireless network interface having antenna 1285, which may represent one or more antenna(e). The computing system 1200 can include multiple wireless network interfaces such as a combination of Wi-Fi, Bluetooth®, near field communication (NFC), and/or cellular telephony interfaces. The network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, the network interface(s) 1280 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1200 can further include one or more energy sources 1205 and one or more energy measurement systems 1245. Energy sources 1205 can include an AC/DC adapter coupled to an external power source, one or more batteries, one or more charge storage devices, a USB charger, or other energy source. Energy measurement systems include at least one voltage or amperage measuring device that can measure energy consumed by the computing system 1200 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides a non-transitory computer-readable storage medium storing instructions which, when executed by one or more processors of an electronic device, cause the one or more processors to perform operations comprising receiving a request to download a second application at an online application store. The request is received at a first application executed by the one or more processors via an application store (app store) interface. The app store interface is presented in response to receipt of an input to select an advertisement for the second application that is presented on a display of the electronic device by the first application.

The advertisement is received from a server of an advertisement network with which the first application is registered. The advertisement is associated with an advertisement campaign provided by the advertisement network. The request to download the second application represents a conversion to be added to conversion metrics for the advertisement campaign. The operations can additionally include retrieving executable instructions for the second application from one or more servers associated with the online application store and creating a postback data structure in memory of the electronic device. The postback data structure represents a notification of the successful conversion for the advertisement campaign and includes data to enable the update of metrics recorded by the advertisement network for the advertisement campaign.

The operation additionally include retrieving, from the one or more servers, anonymity metrics for the advertisement campaign. The metrics can include, for example, a number of downloads of the second application that were requested based on the advertisement campaign, a number of conversions generated by the first application, and/or a number of non-unique combinations of conversions for the advertisement campaign in which the second application is downloaded based on an advertisement presented by the first application. The operations additionally include determining, based on the metrics, a probability that including a given element of advertisement conversion data in the postback data structure would enable the advertisement network, having receipt of the given element of advertisement conversion data, to correlate a specific instance of the first application with a specific instance of the second application. The given element of advertisement conversion data includes a developer conversion value associated with a user account of the app store and an application identifier for the first application. The given element of advertisement conversion data can be included in the postback data structure in response to determining that the probability is below a first threshold. The operations additionally include transmitting the postback data structure to a server associated with the advertisement network.

One embodiment provides for a non-transitory machine readable storage medium having instructions stored thereon. The instructions, when executed by one or more processors of an electronic device, cause the one or more processors to perform operations comprising executing a first application via the one or more processors and receiving a request to download a second application at an interface associated with an application store. The request is received via an application store interface after receipt of an input to select an advertisement displayed by the first application. The advertisement displayed by the first application is associated with an advertisement campaign of an advertisement network and the request to download the second application represents a conversion to be added to conversion metrics for the advertisement campaign. The operations additionally include creating a postback data structure in memory of the electronic device. The postback data structure includes or provides a notification and/or indication of a conversion for an advertisement campaign to which the advertisement is associated, which enables the advertisement network to update conversion metrics for the advertisement campaign that are provided to the developer of the second application.

The operations additionally include receiving or retrieving anonymity metrics associated with the advertisement campaign from one or more servers associated with the application store. The anonymity metrics can be used to determine a set of attribution data to include in the postback data structure. The attribution data is used to enable the advertisement network to attribute the purchase of the second application to the advertisement that was selected to enable the purchase of the second application. The attributions can be aggregated by the advertisement network and provided as metrics to the developer of the second application. The developer of the second application can then use those metrics to rate the return on investment of the advertisement campaign to which the attributed advertisement is associated. In one embodiment the attribution data includes identifiers for the advertisement network, transaction, advertisement campaign, and the advertised application. Based on the anonymity metrics, a conversion value associated with an user account of the application store that was used to purchase and/or download the second application. The conversion value can be included in the set of attribution data that is sent within the postback data structure when the anonymity metrics indicate that the total set of conversions attributed to the advertisement campaign meets a first anonymity threshold. An identifier of the first application can also be included in the set of attribution data. The identifier of the first application can be included in set of attribution data in response to a determination that the anonymity metrics indicate that the set of conversion data for the advertisement campaign meets a second anonymity threshold, where the second anonymity threshold his higher than the first. The identifier of the first application is sent at a higher anonymity threshold due to the higher likelihood that the advertisement network, having knowledge of identifiers of both the first application and the second application, in conjunction with other transaction data known to the advertisement network, will be able to link the conversion to a specific user.

The anonymity metrics associated with the advertisement campaign indicate a number of non-unique combinations of data associated with a set of conversions for the advertisement campaign. The number of non-unique combinations of data associated with the set of conversions for the advertisement campaign include a first set of non-unique combinations of data associated with the first application and a second set of non-unique combinations of data associated with the second application. The first set of non-unique combinations of data includes data that may be determined by program logic associated with the advertisement network that is executed within the process space of the first application. The second set of non-unique combinations of data includes data that may be determined by program logic associated with the advertisement network that is executed within the process space of the second application.

Once the set of attribution data to include in the postback data structure is determined, the electronic device can then transmit the postback data structure to a server associated with the advertisement network. The advertisement network can then aggregate the attribution data to generate metrics for the advertisement campaign to provide to the developer of the second application. The postback data structure can additionally include an attribution signature that attests to the validity of the attribution data included in the postback data structure. The attribution signature can be generated based on the attribution data using a signing key that is associated with the application store and/or a server of the application store. The attribution signature can be verified by the advertisement network to determine the validity of the attribution data and prevent fraudulent or counterfeit attributions from being included in the metrics generated for the advertisement campaign.

In a further embodiment, one or more processors can perform operations to download the second application in response to receipt of the request to download the second application. Downloading the second application includes receiving or retrieving a package of executable instructions for the second application from one or more servers associated with the application store. The second application can be installed or re-installed on the electronic device and launched for execution by the electronic device. In one embodiment, after launch of the second application, the electronic device can receive an update from the second application of a metric associated with a value of the conversion. The metric associated with the value of the conversion includes an indication of activity performed using the second application for a period of time after downloading the second application. The operations additionally include starting a timer in response to the update of the value of the conversion and, after expiration of the timer, determining whether to add the value of the conversion to the set of data to include in the postback data structure based on the anonymity metrics associated with the advertisement campaign. The value of the conversion can be added to the set of data in response to a determination that the anonymity metrics meet a first threshold and an identifier of the first application can be added to the set of data in response to a determination that the anonymity metrics meet a second threshold, with the second threshold being higher than the first threshold.

In one embodiment, operations are performed by processes associated with application store for an electronic device. The operations include receiving an event indicating selection of an invitation to acquire a second application, with the invitation being presented by a first application. The operations additionally include presenting an interface to enable acquisition of the second application, receiving an input via the interface to acquire the second application, and transmitting a request to acquire the application to a server associated with the application store along with data attributing the request to the advertisement presented by the first application. The operations further include determining anonymity metrics associated with the advertisement campaign based on an estimate of a number of non-unique combinations of attribution data for conversions associated with the advertising campaign. In various embodiments, the determination can be performed on a server of the application store based on an estimate of the number of non-unique combinations of attribution data associated with the set of conversions attributed to the advertising campaign as adjusted by one or more multipliers. In one embodiment the server can include an identifier of the first application within a set of attribution data to be signed by the application store in response to determining that the anonymity metrics indicate that the crowd anonymity of the conversion data exceeds a threshold. The server can then perform operations to sign a set of attribution data to be transmitted to the advertisement network using a signing key associated with the application store. The signature can be verified by the advertisement network.

Systems, methods, and electronic devices that implement the above operations are also provided by embodiments described herein. Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A non-transitory machine readable medium having instructions stored thereon, the instructions which, when executed by one or more processors of an electronic device, cause the one or more processors to perform operations comprising:
   executing a first application via the one or more processors;
   receiving a request to download a second application at an interface associated with an application store, the request received via an application store interface after receipt of an input to select an advertisement displayed by the first application, wherein the advertisement displayed by the first application is associated with an advertisement campaign of an advertisement network and the request to download the second application represents a conversion to be added to conversion metrics for the advertisement campaign;
   creating a postback data structure in memory of the electronic device, the postback data structure including a notification of a conversion for an advertisement campaign to which the advertisement is associated;
   retrieving, from one or more servers associated with the application store, anonymity metrics associated with the advertisement campaign;
   determining, based on the anonymity metrics, a set of data to include in the postback data structure, the anonymity metrics corresponding to a set of conversions for the advertisement campaign;
   adjusting the postback data structure based at least in part on the determined set of data to include in the postback data structure; and
   transmitting, after the adjusting, the postback data structure to a server associated with the advertisement network, the postback data structure including the set of data determined based on the anonymity metrics.

2. The non-transitory machine readable medium as in claim 1, the operations further comprising presenting a user interface element within a user interface presented by the first application, the user interface element including the advertisement, wherein the advertisement is provided by the advertisement network.

3. The non-transitory machine readable medium as in claim 2, the operations further comprising presenting the interface associated with the application store interface in response to receiving the input to select the advertisement displayed by the first application.

4. The non-transitory machine readable medium as in claim 1, wherein the anonymity metrics associated with the advertisement campaign indicate a number of non-unique combinations of data associated with the set of conversions for the advertisement campaign.

5. The non-transitory machine readable medium as in claim 4, wherein the number of non-unique combinations of data associated with the set of conversions for the advertisement campaign include a first set of non-unique combinations of data associated with the first application and a second set of non-unique combinations of data associated with the second application.

6. The non-transitory machine readable medium as in claim 5, wherein the first set of non-unique combinations of data includes combinations of an identifier of the first application, and identifier of the second application, an identifier associated with the advertisement campaign, and an identifier associated with the advertisement network.

7. The non-transitory machine readable medium as in claim 5, wherein the second set of non-unique combinations of data includes combinations of an identifier of the second application and an identifier associated with the advertisement network.

8. The non-transitory machine readable medium as in claim 5, the operations further comprising:
   in response to determining that the anonymity metrics meet a first anonymity threshold determined based on the number of non-unique combinations of data associated with the set of conversions for the advertisement campaign, including a first additional unit of data in the set of data to include in the postback data structure; and
   in response to determining that the anonymity metrics meet a second anonymity threshold determined based on the number of non-unique combinations of data associated with the set of conversions for the advertisement campaign, including a second additional unit of data in the set of data to include in the postback data structure.

9. The non-transitory machine readable medium as in claim 8, the operations further comprising, after launch of the second application, receiving an update from the second application of a metric associated with a value of the conversion, wherein the metric associated with the value of the conversion includes an indication of activity performed using the second application for a period of time after downloading the second application.

10. The non-transitory machine readable medium as in claim 9, wherein the first additional unit of data includes the metric associated with the value of the conversion.

11. The non-transitory machine readable medium as in claim 9, wherein second additional unit of data in the set of data includes an identifier of the first application.

12. A data processing system comprising:
    a memory configurable to store instructions;
    one or more processors coupled with the memory, wherein the instructions, when executed, cause the one or more processors to perform operations to:
      execute a first application via the one or more processors;
      receive a request to download a second application at an interface associated with an application store, the request received via an application store interface after receipt of an input to select an advertisement displayed by the first application, wherein the advertisement displayed by the first application is associated with an advertisement campaign of an advertisement network and the request to download the second application represents a conversion to be added to conversion metrics for the advertisement campaign;

create a postback data structure in the memory, the postback data structure including a notification of a conversion for an advertisement campaign to which the advertisement is associated;

retrieve, from one or more servers associated with the application store, anonymity metrics associated with the advertisement campaign;

determine, based on the anonymity metrics, a set of data to include in the postback data structure, the anonymity metrics corresponding to a set of conversions for the advertisement campaign;

adjust the postback data structure based at least in part on the determined set of data to include in the postback data structure; and transmit, after the adjust, the postback data structure to a server associated with the advertisement network, wherein the postback data structure includes the set of data determined based on the anonymity metrics.

13. The data processing system as in claim 12, the one or more processors to perform operations to download the second application in response to receipt of the request to download the second application, wherein to download the second application includes to receive or retrieve a package of executable instructions for the second application from one or more servers associated with the application store.

14. The data processing system as in claim 13, the one or more processors to: launch the second application;

after launch of the second application, receive an update from the second application of a metric associated with a value of the conversion, wherein the metric associated with the value of the conversion includes an indication of activity performed using the second application for a period of time after downloading the second application;

start a timer in response to the update of the value of the conversion; and after expiration of the timer, determine whether to add the value of the conversion to the set of data to include in the postback data structure based on the anonymity metrics associated with the advertisement campaign.

15. The data processing system as in claim 14, the one or more processors to add the value of the conversion to the set of data to include in the postback data structure in response to determination that the anonymity metrics meet a first threshold.

16. The data processing system as in claim 15, the one or more processors additionally to add an identifier of the first application to the set of data to include in the postback data structure in response to determination that the anonymity metrics meet a second threshold, the second threshold higher than the first threshold.

17. A method comprising:
on an electronic device including one or more processors:
executing a first application via the one or more processors;

receiving a request to download a second application at an interface associated with an application store, the request received via an application store interface after receipt of an input to select an advertisement displayed by the first application, wherein the advertisement displayed by the first application is associated with an advertisement campaign of an advertisement network and the request to download the second application represents a conversion to be added to conversion metrics for the advertisement campaign;

creating a postback data structure in memory of the electronic device, the postback data structure including a notification of a conversion for an advertisement campaign to which the advertisement is associated;

retrieving, from one or more servers associated with the application store, anonymity metrics associated with the advertisement campaign;

determining, based on the anonymity metrics, a set of data to include in the postback data structure, the anonymity metrics corresponding to a set of conversions for the advertisement campaign;

adjusting the postback data structure based at least in part on the determined set of data to include in the postback data structure; and transmitting, after the adjusting, the postback data structure to a server associated with the advertisement network, the postback data structure including the set of data determined based on the anonymity metrics.

18. The method as in claim 17, further comprising presenting a user interface element within a user interface presented by the first application, the user interface element including the advertisement, wherein the advertisement is provided by the advertisement network and the interface associated with the application store interface is presented in response to receiving the input to select the advertisement displayed by the first application.

19. The method as in claim 17, wherein the anonymity metrics associated with the advertisement campaign indicate a number of non-unique combinations of data associated with the set of conversions for the advertisement campaign.

20. The method as in claim 19, wherein the number of non-unique combinations of data associated with the set of conversions for the advertisement campaign include a first set of non-unique combinations of data associated with the first application and a second set of non-unique combinations of data associated with the second application.

* * * * *